United States Patent
Haug et al.

(10) Patent No.: US 6,329,021 B1
(45) Date of Patent: Dec. 11, 2001

(54) METHOD FOR PRODUCING A SURFACE COATING ON A SUBSTRATE USING A MATERIAL WIRE

(75) Inventors: Tilmann Haug, Uhdingen-Mühlhof; Patrick Izquierdo, Ulm; Wolfgang Reichle, Lenningen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/394,903

(22) Filed: Sep. 13, 1999

(30) Foreign Application Priority Data

Sep. 11, 1998 (DE) .............................. 198 41 619

(51) Int. Cl.[7] .................. C23C 4/04; C23C 4/12
(52) U.S. Cl. .............. 427/449; 427/452; 427/456; 219/146.22; 219/146.32
(58) Field of Search .................... 427/449, 452, 427/456; 219/146.22, 146.31, 146.32

(56) References Cited

U.S. PATENT DOCUMENTS

| | | |
|---|---|---|
| 3,436,248 | 4/1969 | Dittrich et al. . |
| 4,711,823 | 12/1987 | Shiina ............................. 428/547 |
| 4,737,206 | 4/1988 | Iwai ................................. 148/438 |
| 4,959,276 | 9/1990 | Hagiwara et al. ................ 428/614 |
| 4,969,428 | 11/1990 | Donahue et al. ................ 123/195 R |
| 5,022,455 | 6/1991 | Takeda et al. . |
| 5,294,462 | * 3/1994 | Kaiser et al. .................... 427/446 |
| 5,418,072 | * 5/1995 | Baldantoni et al. .............. 428/558 |

FOREIGN PATENT DOCUMENTS

| | | |
|---|---|---|
| 3941381A1 | 12/1989 | (DE) . |
| 4020268C1 | 6/1990 | (DE) . |
| 4341537A1 | 12/1993 | (DE) . |
| 4434576A1 | 9/1994 | (DE) . |
| 4438550A1 | 10/1994 | (DE) . |
| 19601793 | 7/1997 | (DE) . |
| 19733208C1 | 8/1997 | (DE) . |
| 0009210 | 2/1980 | (EP) . |
| 0526079B1 | 11/1996 | (EP) . |
| 0896073 | 2/1999 | (EP) . |
| 0899354 | 3/1999 | (EP) . |
| 1460086 | 12/1976 | (GB) . |
| 51-129826 | 11/1976 | (JP) . |
| 56166368 | 12/1981 | (JP) . |
| WO 90/12899 | 4/1989 | (WO) . |

* cited by examiner

*Primary Examiner*—Katherine A. Bareford
(74) *Attorney, Agent, or Firm*—Crowell & Moring LLP

(57) ABSTRACT

A material wire for producing wear-resistant and tribologically favorable surface coatings from a supereutectic Al/Si alloy by thermal spraying. The material wire is a filling wire that has a sheath made of metallic aluminum and a filling made of one or more additional alloy components.

30 Claims, 2 Drawing Sheets

METHOD FOR PRODUCING A SURFACE COATING ON A SUBSTRATE USING A MATERIAL WIRE

BACKGROUND AND SUMMARY OF INVENTION

This application claims the priority of German Patent Document 198 41 619.9, filed Sep. 11, 1998, published Mar. 23, 2000, the disclosure of which is expressly incorporated by reference herein.

The present invention relates to a material wire for producing wear-resistant and tribologically favorable surface coatings from supereutectic Al/Si alloys by thermal spraying.

Coatings of Al/Si alloys are known. In particular, such coating are used as cylinder running surfaces of cylinder housings of reciprocating piston engines. Coatings of Al/Si alloys are known, for example, from U.S. Pat. No. 5,022,455. Molten aluminum and silicon particles are sprayed separately onto the surface to be coated. Other Al/Si alloys are known, for example, from DE 40 20 268 C1; U.S. Pat. No. 4,711,823; U.S. Pat. No. 4,737,206; U.S. Pat. No. 4,969,428; and DE 44 38 550 A1. Another alloy is known from U.S. Pat. No. 4,959,276.

Coatings of this kind can be applied in many different ways to the surfaces of substrates. Thermal spraying, such as wire arc spraying or plasma spraying, are especially suitable. In plasma spraying, powdered starting material melted in a flame is used. In wire arc spraying, a metal starting material in the form of a material wire is used. Wire arc spraying is especially preferred because it permits a high application rate of the coating by high cycles and is economical in terms of both the material and the system.

A composite material wire is disclosed in DE 43 41 537 A1 for wire arc spraying as well as a method for its manufacture. The wire has a solid core made of conducting metal and a jacket in which solid lubricant particles and wear-resistant particles are suspended homogeneously in a conducting metal that corresponds to the solid core. A composite wire of this kind, however, is relatively costly to manufacture and is not suitable for all applications.

The object of the present invention is to produce a material wire that can be manufactured simply and economically and that permits the production of surface coatings from a supereutectic Al/Si alloys.

This object is achieved by a material wire that is a filler wire having a jacket made of metallic aluminum and a filling made of one or more alloy components.

The alloy components (i.e., the starting materials for making the desired Al/Si alloy) are used for producing the wire. The hollow aluminum jacket remains unchanged and the filling is put together individually depending on the composition required in the desired Al/Si alloy. The individual components combine during melting in wire arc spraying and during application to the surface of the actual alloy. In this fashion, a material wire is produced that can be manufactured simply and economically and which can be used to make any Al/Si alloy.

One especially preferred embodiment of the material wire according to the present invention contains silicon in the filling as well as nickel, iron, magnesium, copper, cobalt, chromium, manganese, tin, zinc, zirconium and/or additional alloy components. The quantity of silicon in the filling is such that the resultant alloy contains about 17–40 wt. % silicon.

Another advantageous embodiment consists in the fact that the filling, in addition to the other alloy components, also contains additional additives, for example, hard metal particles, ceramic particles, or dry lubricants.

The material wire according to the present invention is preferably processed to form an aluminum-silicon alloy which is essentially copper-free, in other words it contains less than 1 wt. % copper.

The material wire according to the present invention is especially suited for making cylinder running surfaces in internal combustion engines. It is especially suitable for making coatings like those known from unpublished German Patent Application 197 33 208.8-45, filed on Aug. 1, 1997. These coatings consist essentially of a supereutectic aluminum-silicon alloy or an aluminum-silicon composite marked by a heterogeneous layer structure of aluminum-mixed crystal; a coarse to very fine network of eutectic silicon, silicon precipitates or particles; intermetallic phases; and extremely finely distributed oxides. These coatings have characteristic primary aluminum-mixed crystal dendrites in which the dendrite arms are sheathed in eutectic silicon. The polished sections of such coatings show a characteristic spongy appearance. Silicon-primary precipitates and silicon particles are present in only small quantities and have a small diameter. During the surface treatment of these layers, the dendrite arms that lie on the surface are polished so that during subsequent exposure the aluminum is etched away and aluminum-free silicon structures remain that form the actual running surface.

The material wire according to the present invention is especially suited for wire arc spraying but also for high-speed flame spraying (HVOF).

Other objects, advantages and novel features of the present invention will become apparent from the following detailed description of the invention when considered in conjunction with the accompanying drawings.

DETAILED DESCRIPTION OF THE DRAWINGS

Figure 1:
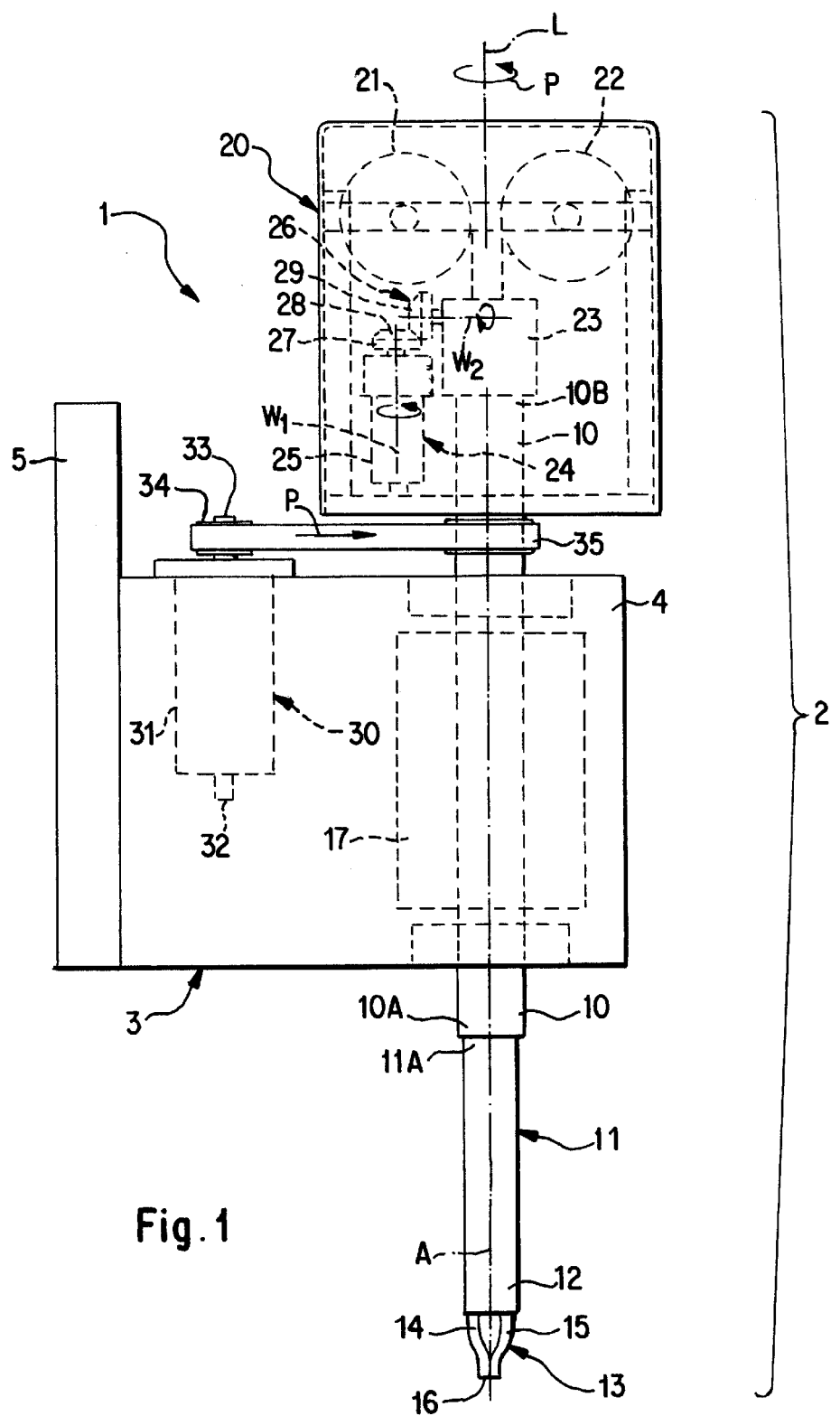
FIG. 1 is a device for thermal spraying in which the material wire according to the present invention can be used.

The material wire according to the present invention, for example, can be used in a device 1 like that shown in FIG. 1. Device 1 has a wire arc spraying device 2 fastened to a holder 3. Holder 3 consists of a holding block 4 and a mounting flange 5 provided on holding block 4. Mounting flange 5 serves to couple the device according to the present invention, for example, with a robot arm or with another holding device.

The wire arc spraying device 2 has a burner shaft 10 made in the form of a hollow body, in this case a hollow shaft. At one end 10A, the burner shaft 10 has an internal burner 11 with a hollow burner rod 12 and the actual burner head 13. On burner head 13 there are two supply wires 14, 15 between which an arc is struck, as well as a compressed air nozzle 16 located radially with respect to the lengthwise axis A of internal spraying device 2.

Internal burner 11 is inserted replaceably by its end 11A opposite burner head 13 by means of a coupling device, not shown here, into the burner shaft 10. This means that the internal burner 11 can be replaced by other internal burners, for example, those with a larger or smaller diameter in order to be able to coat hollow bodies with various inside diameters. Feed devices provided for the wires or the distributor gas can be coupled to one another by the coupling.

Burner shaft 10 is rotatably mounted in a bearing 17 provided in holding block 4 so that it can turn around its lengthwise axis L. The drive of the burner shaft 10 comes from a driving device 30 integrated into the holding block 4. This device 30 consists essentially of a motor 31 driving a shaft 32. Shaft 32 projects at its upper free end out of holding block 4 and bears a wheel 34 at its upper free end 33 with a drive belt 35 wrapped around the wheel. The belt 35 is also wrapped around the burner shaft 10 above holding block 4 and thus confers its rotary motion, for example, in the direction of arrows P.

Bearing 17 is equipped with slip rings, not shown here, to produce energy and to transmit it. In this way, as a result of the rotation of burner shaft 10, the required energy is produced that is needed to trigger the light arc between wires 14 and 15. Bearing 17 also has gas distributor bores, likewise not shown. In these gas distributor bores, supply lines for the distributor gas terminate that are located within the holding block 4. The distributor gas, like the wires 14, 15, passes through the hollow burner shaft 10 and the hollow burner rod 12 of the internal burner 11 and thus reaches burner head 13, where it escapes from the distributor nozzle 16.

At the end 10B of the burner shaft 10 remote from internal burner 11, a feed device 20 is fastened. The feed device 20 rotates together with the burner shaft 10 in the direction of arrow P around the lengthwise axis L of the internal injection device 2. The advancing device 20 has two wire bobbins 21, 22 on which the wires 14, 15 are wrapped. The wires 14, 15 unwound from bobbins 21, 22 are fed by a wire feed unit 23 in the direction of burner head 13. A wire guide connected to the wire feed unit 23 is provided that ensures that wires 14, 15 do not intersect when the wire is being fed. Feeding device 20 also has a drive 24 for wire feed unit 23. In the embodiment, there is a motor 25 and a transmission member 26 made of gears 27, 29 that mesh with one another. Gear 27 is associated with motor 25 and fastened to a shaft 28 which, driven by motor 25, rotates around its axis $W_1$. Gear 29 is associated with the wire feed unit 23 and is located at right angles to gear 27 and rotates around its axis $W_2$. The rotational directions of gears 27, 29 are indicated by arrows.

The function of the wire arc spraying device is known. Between the ends of the two wires 14, 15, an arc is struck which melts the material of the wires (metal or metal alloy). The compressed air escaping from the nozzle, or the distributor gas, atomizes the molten material into fine droplets that settle on the surface to be coated.

Figure 2:
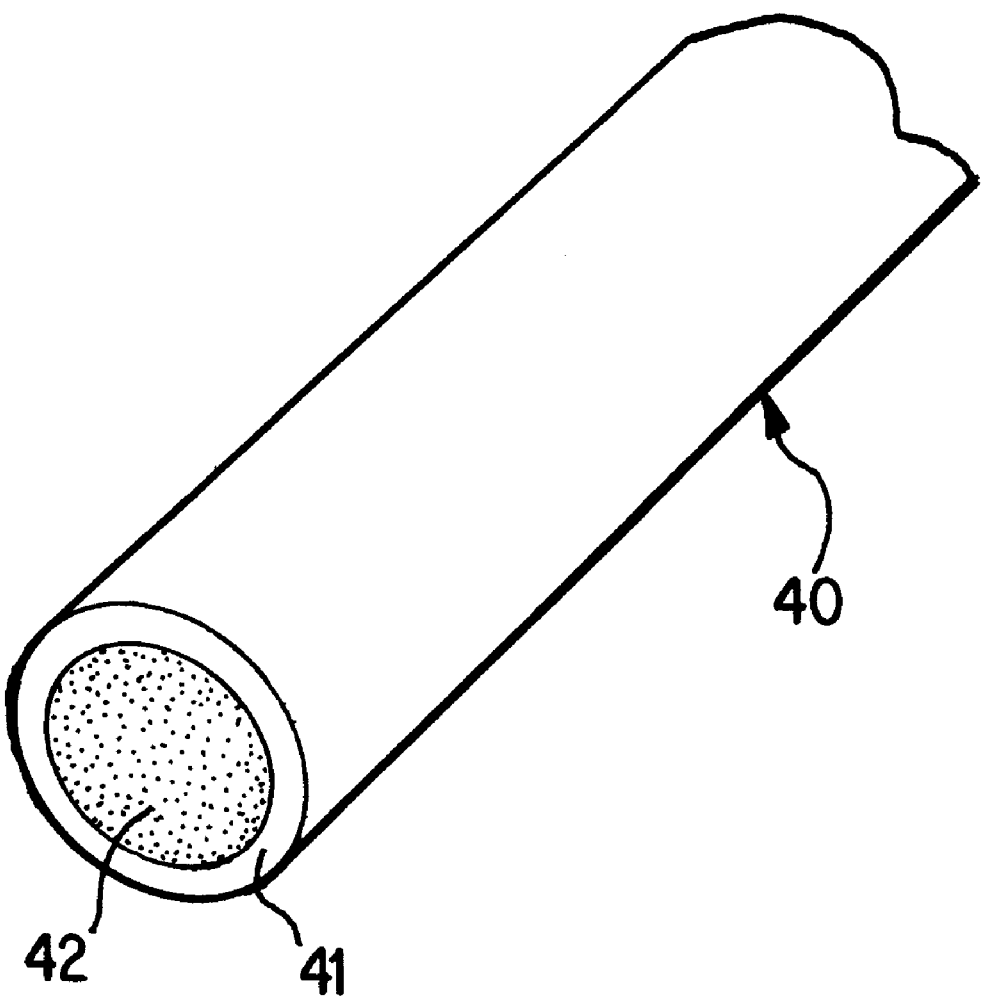
FIG. 2 is a schematic representation of a material wire according to the present invention.

At least one of the wires 14, 15 used is a material wire 40 according to the present invention, as shown schematically in FIG. 2. Material wire 40 has a sheath 41 made of metallic aluminum and a filling 42 made of one or more additional alloy components. These additional alloy components can be silicon, nickel, iron, magnesium, copper, cobalt, chromium, manganese, tin, zinc, zirconium and/or other alloy components. The volume ratios in filling 42 correspond to those in the finished thermally sprayed layer. In an embodiment, a material wire 40 was selected with a sheath 41 made of aluminum and a filling made of 25 parts silicon, 4 parts nickel, 1.2 parts iron, and 1.2 parts magnesium. The resultant supereutectic Al/Si alloy was therefore Al 25Si 4Ni 1.2 Fe 1.2 Mg.

Additional material wires used in the embodiments have the following compositions:

Material Wire A
  Silicon: 23 to 40 parts, preferably approximately 25 parts;
  Magnesium: 0.8 to 2 parts, preferably approximately 1.2 parts;
  Zirconium: maximum 0.6 parts;
  Iron: maximum 0.25 parts;
  Manganese, nickel, copper, and zinc: maximum of 0.01 parts each;
  Remainder aluminum.
Material Wire B
  Silicon: 23 to 40 parts, preferably approximately 25 parts;
  Nickel: 1 to 5 parts, preferably approximately 4 parts;
  Iron: 1 to 1.4 parts, preferably approximately 1.2 parts;
  Magnesium: 0.8 to 2 parts, preferably approximately 1.2 parts;
  Zirconium: maximum 0.6 parts;
  Manganese, copper, and zinc: maximum of 0.01 parts each;
  Remainder aluminum.

Additional fillings can equally well be used in which there is an agglomerated composite powder made of fine silicon particles and fine metallic particles of at least an aluminum-silicon alloy which are bonded together by inorganic or organic binders. The quantity of silicon particles is 5 to 95 wt. %, the amount of alloy particles 95 to 50 wt. %. The silicon particles have an average grain size of 0.1 to 10 μm, preferably approximately 5 μm. The alloy particles have an average grain size of 0.1 to 50 μm, preferably approximately 5 μm.

The alloy particles preferably consist of a mixture of subeutectic alloy particles and supereutectic alloy particles. By using supereutectic alloy particles, the quantity of aluminum mixed crystal in the layer structure of the later coating is retained. By using subeutectic alloy particles, the formation of the aluminum mixed crystal is suppressed. In the following, two examples are provided for suitable subeutectic and supereutectic alloys.

Subeutectic Alloys:
  Alloy 1:
  Silicon: 0 to 11.8 wt. %, preferably approximately 9 wt. %;
  Iron: maximum 0.25 wt. %;
  Magnesium: 0.8 to 2.0 wt. %, preferably approximately 1.2 wt. %;
  Zirconium: maximum 0.6 wt. %;
  Manganese, nickel, copper, and zinc: maximum of 0.01 wt. % each;
  Remainder aluminum.
  Alloy 2:
  Silicon: 0 to 11.8 wt. %, preferably approximately 9 wt. %;
  Nickel: 1.0 to 5.0 wt. %, preferably approximately 4 wt. %;
  Iron: 1.0 to 1.4 wt. %, preferably approximately 1.2 wt. %;
  Magnesium: 0.8 to 2.0 wt. %, preferably approximately 1.2 wt. %;
  Zirconium: maximum 0.6 wt. %;
  Manganese, copper, and zinc: maximum of 0.01 wt. % each;
  Remainder aluminum.
Supereutectic Alloys:

Alloy 3:
Silicon: 11.8 to 40.0 wt. %, preferably approximately 17 wt. %;
Iron: maximum 0.25 wt. %;
Magnesium: 0.8 to 2.0 wt. %, preferably approximately 1.2 wt. %;
Zirconium: maximum 0.6 wt. %;
Manganese, copper, nickel, and zinc: maximum of 0.01 wt. % each;
Remainder aluminum.
Alloy 4:
Silicon: 11.8 to 40.0 wt. %, preferably approximately 17 wt. %;
Nickel: 1.0 to 5.0 wt. %, preferably approximately 4 wt. %;
Iron: 1.0 to 1.4 wt. %, preferably approximately 1.2 wt. %;
Magnesium: 0.8 to 2.0 wt. %, preferably approximately 1.2 wt. %;
Zirconium: maximum 0.6 wt. %;
Manganese, copper, and zinc: maximum of 0.01 wt. % each;
Remainder aluminum.

The material wire according to the present invention is especially well suited for making coatings on cylinder running surfaces.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of forming a coating on a surface of a substrate by thermal spraying, comprising:
   melting a material wire;
   atomizing the molten material wire; and
   coating the surface of the substrate with droplets of atomized molten material wire, thereby forming a wear-resistant and tribological coating comprising a supereutectic aluminum-silicon alloy or aluminum-silicon composite,
   wherein said material wire comprises a sheath comprising metallic aluminum and a filling comprising one or more alloy components and having less than 0.01 wt. % copper.

2. A method of forming a coating according to claim 1, wherein said method is by wire arc spraying or flame spraying.

3. A method according to claim 1, wherein the filling comprises silicon and at least one element selected from the group consisting of nickel, iron, magnesium, copper, cobalt, chromium, manganese, tin, zinc, and zirconium.

4. A method according to claim 1, wherein the filling further comprises at least one additional component selected from the group consisting of hard metal particles, ceramic particles, and dry lubricants.

5. A method according to claim 1, wherein the filling comprises:
   an agglomerated composite powder made of silicon particles; and
   metallic particles of at least one aluminum-silicon alloy,
   wherein said silicon particles and said metallic particles are bonded together by a binder.

6. A method according to claim 5, wherein the quantity of silicon particles is 5 to 95 wt. % and the quantity of alloy particles is 50 to 95 wt. % in the aluminum-silicon alloy.

7. A method according to claim 5, wherein the silicon particles have an average grain size of 0.1 to 10 $\mu$m.

8. A method according to claim 5, wherein the silicon particles have an average grain size of 5 $\mu$m.

9. A method according to claim 5, wherein the alloy particles have an average grain size of 0.1 to 50 $\mu$m.

10. A method according to claim 5, wherein the alloy particles have an average grain size of approximately 5 $\mu$m.

11. A method according to claim 5, wherein the alloy particles consist of a mixture of subeutectic alloy particles and supereutectic alloy particles.

12. A method according to claim 11, wherein the subeutectic alloy particles comprise:
    0 to 11.8 weight % silicon;
    maximally 0.25 weight % iron;
    0.8 to 2.0 weight % magnesium;
    maximally 0.6 weight % zirconium;
    maximally 0.01 weight % respectively of manganese, nickel, copper, and zinc; and
    remainder aluminum.

13. A method according to claim 12, wherein the subeutectic alloy particles comprise approximately 9 weight % silicon.

14. A method according to claim 12, wherein the subeutectic alloy particles comprise approximately 1.2 weight % magnesium.

15. A method according to claim 11, wherein the subeutectic alloy particles comprise:
    0 to 11.8 weight % silicon;
    1.0 to 5.0 weight % nickel;
    1.0 to 1.4 weight % iron;
    0.8 to 2.0 weight % magnesium;
    maximally 0.6 weight % zirconium;
    maximally 0.01 weight % respectively of manganese, copper, and zinc; and
    remainder aluminum.

16. A method according to claim 15, wherein the subeutectic alloy particles comprise approximately 9 weight % silicon.

17. A method according to claim 15, wherein the subeutectic alloy particles comprise approximately 4 weight % nickel.

18. A method according to claim 15, wherein the subeutectic alloy particles comprise approximately 1.2 weight % iron.

19. A method according to claim 15, wherein the subeutectic alloy particles comprise approximately 1.2 weight % magnesium.

20. A method according to claim 11, wherein the supereutectic alloy particles comprise:
    11.8 to 40.0 weight % silicon;
    maximally 0.25 weight % iron;
    0.8 to 2.0 weight % magnesium;
    maximally 0.6 weight % zirconium;
    maximally 0.01 weight % respectively of manganese, copper, nickel, and zinc; and
    remainder aluminum.

21. A method according to claim 20, wherein the supereutectic alloy particles comprise approximately 17 weight % silicon.

22. A method according to claim 20, wherein the supereutectic alloy particles comprise approximately 1.2 weight % magnesium.

23. A method according to claim 11, wherein the supereutectic alloy particles comprise:
- 11.8 to 40.0 weight % silicon;
- 1.0 to 5.0 weight % nickel;
- 1.0 to 1.4 weight % iron;
- 0.8 to 2.0 weight % magnesium;
- maximally 0.6 weight % zirconium;
- maximally 0.01 weight % respectively of manganese, copper, and zinc; and
- remainder aluminum.

24. A method according to claim 23, wherein the supereutectic alloy particles comprise approximately 17 weight % silicon.

25. A method according to claim 23, wherein the supereutectic alloy particles comprise approximately 4 weight % nickel.

26. A method according to claim 23, wherein the supereutectic alloy particles comprise approximately 1.2 weight % iron.

27. A method according to claim 23, wherein the supereutectic alloy particles comprise approximately 1.2 weight % magnesium.

28. A method according to claim 11, wherein said method is by at least one of wire arc spraying or flame spraying.

29. A method according to claim 11, wherein the substrate is a cylinder running surface in a cylinder bore of an internal-combustion engine.

30. A method according to claim 1, wherein the quantity of silicon is such that the aluminum-silicon alloy contains approximately 17–40 wt. % silicon.

* * * * *